United States Patent
Christin et al.

(10) Patent No.: US 9,560,638 B2
(45) Date of Patent: Jan. 31, 2017

(54) SHORT PHYSICAL-LAYER CONTROL FRAMES

(71) Applicant: Orange, Paris (FR)

(72) Inventors: Philippe Christin, Rennes (FR); Laurent Cariou, Rennes (FR)

(73) Assignee: ORANGE, Paris (FR)

( * ) Notice: Subject to any disclaimer, the term of this patent is extended or adjusted under 35 U.S.C. 154(b) by 54 days.

(21) Appl. No.: 14/406,126

(22) PCT Filed: Jun. 5, 2013

(86) PCT No.: PCT/FR2013/051281
§ 371 (c)(1),
(2) Date: Dec. 5, 2014

(87) PCT Pub. No.: WO2013/182812
PCT Pub. Date: Dec. 12, 2013

(65) Prior Publication Data
US 2015/0139107 A1    May 21, 2015

(30) Foreign Application Priority Data
Jun. 5, 2012 (FR) ...................................... 12 55196

(51) Int. Cl.
*H04W 72/04* (2009.01)
*H04L 1/00* (2006.01)
*H04L 1/16* (2006.01)

(52) U.S. Cl.
CPC ........ *H04W 72/0406* (2013.01); *H04L 1/0079* (2013.01); *H04L 1/1685* (2013.01)

(58) Field of Classification Search
None
See application file for complete search history.

(56) References Cited

U.S. PATENT DOCUMENTS

| | | | |
|---|---|---|---|
| 7,447,200 B2 * | 11/2008 | Chan | H04B 3/54 370/389 |
| 9,301,196 B2 * | 3/2016 | Asterjadhi | H04L 1/0025 |
| 2005/0249244 A1 * | 11/2005 | McNamara | H04L 1/0025 370/474 |
| 2007/0133490 A1 | 6/2007 | Kwon | |
| 2009/0092039 A1 | 4/2009 | Niu et al. | |

(Continued)

OTHER PUBLICATIONS

International Preliminary Report on Patentability and English translation of the Written Opinion dated Dec. 9, 2014 for corresponding International Application No. PCT/FR2013/051281, filed Jun. 5, 2013.

(Continued)

*Primary Examiner* — Hassan Kizou
*Assistant Examiner* — Deepa Belur
(74) *Attorney, Agent, or Firm* — David D. Brush; Westman, Champlin & Koehler, P.A.

(57) ABSTRACT

A method is provided for transmitting a control frame from a emitting entity to a receiving entity. The control frame includes what is called a "first layer" header field intended to convey information relating to a first layer. The method includes a modulation step employing a first modulation technique, and, before the modulation step, a step of inserting information relating to a second layer into the first layer header field.

7 Claims, 5 Drawing Sheets

(56) References Cited

U.S. PATENT DOCUMENTS

| | | | |
|---|---|---|---|
| 2012/0250617 A1* | 10/2012 | Wentink | H04L 29/12839 370/328 |
| 2013/0170345 A1* | 7/2013 | Merlin | H04W 28/065 370/230 |
| 2014/0137210 A1* | 5/2014 | Kountouris | H04W 12/06 726/4 |
| 2014/0198780 A1* | 7/2014 | Qi | H04W 28/065 370/338 |
| 2016/0036701 A1* | 2/2016 | Park | H04L 1/1896 370/329 |
| 2016/0174102 A1* | 6/2016 | Asterjadhi | H04L 69/04 370/389 |

OTHER PUBLICATIONS

International Search Report and Written Opinion dated Sep. 17, 2013 for corresponding International Application No. PCT/FR2013/051281, filed Jun. 5, 2013.

French Search Report and Written Opinion dated Jan. 30, 2013 for corresponding French Application No. 1255196, filed Jun. 5, 2012.

* cited by examiner

SHORT PHYSICAL-LAYER CONTROL FRAMES

CROSS-REFERENCE TO RELATED APPLICATION

This Application is a Section 371 National Stage Application of International Application No. PCT/FR2013/051281, filed Jun. 5, 2013 and published as WO 2013/182812 A1 on Dec. 12, 2013, not in English, the contents of which are hereby incorporated by reference in their entirety.

1. FIELD OF THE INVENTION

The field of the invention is that of communication systems using a radio, electrical or optical transmission channel, and more particularly that of the management of a channel using control frames, when said channel is shared between a plurality of transmitting or receiving entities.

2. PRIOR ART

In radio communication systems, powerline communication and wireless optical communication, the transmission channel is a shared resource that is perturbed by interference between the various transmitting and receiving entities that share the channel, and by collisions between the various data frames passing through the channel. To make the data frame interchanges more reliable, so-called "control" frames are interchanged between the transmitting and receiving entities, before and after a data frame interchange.

Figure 1:
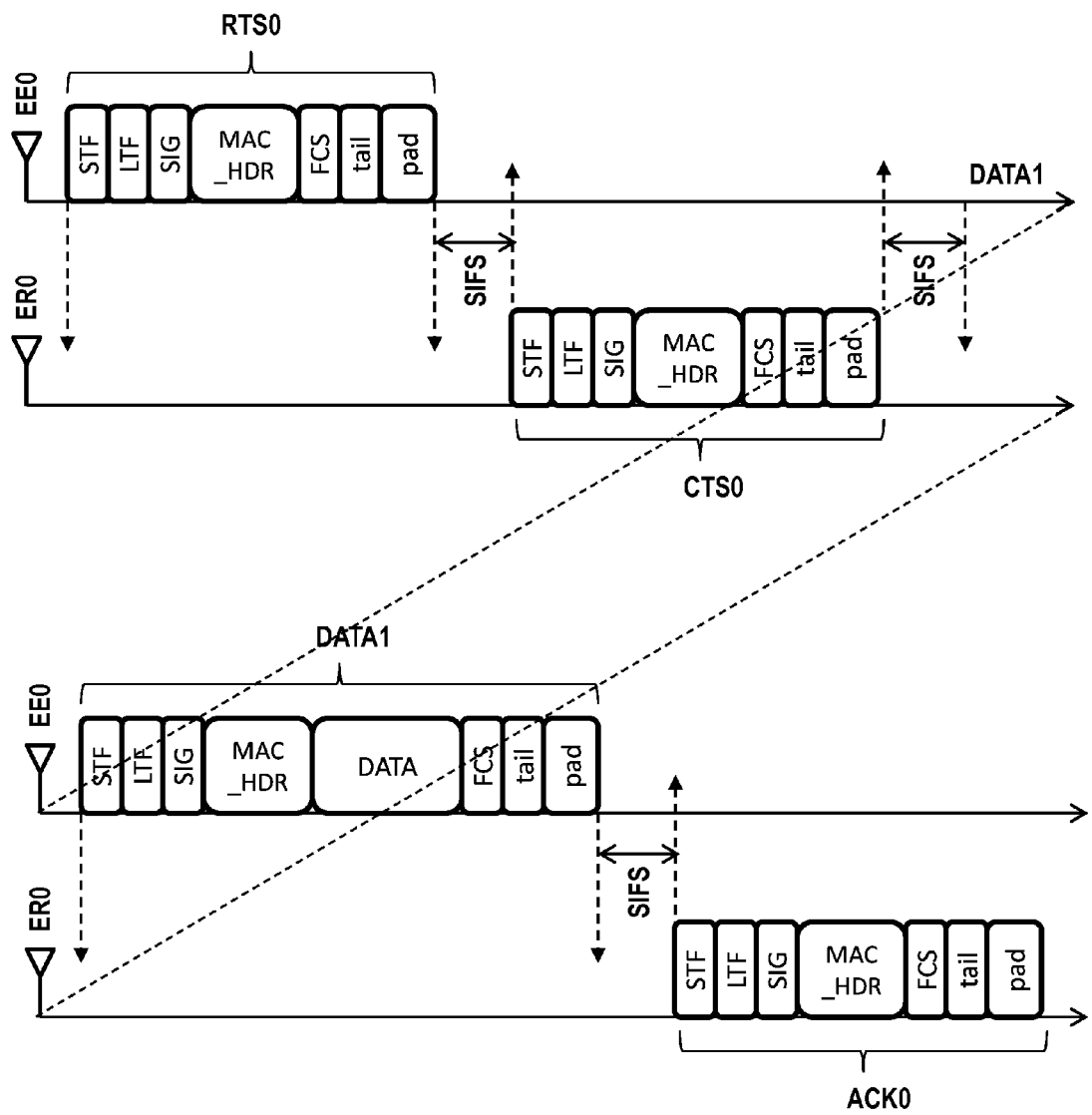

The data frames and the control frames are in the same format. FIG. 1 illustrates the composition of a frame, taking as a basis the IEEE 802.11 (WiFi) standard example of a data frame DATA1 and three control frames RTS0, CTS0 and ACK0. Such frames comprise all of the following parts:
- a PLCP (Physical Layer Convergence Protocol) header, comprising the fields STF (Short Training Field), LTF (Long Training Field) and SIG (Signal Field),
- an MAC (Medium Access Control) header with a Frame Control field indicating the type of the frame (DATA for a data frame or ACK for an acknowledgement frame, for example), and one or more fields that may be, inter alia, a source MAC address field, a destination MAC address field, and/or a Duration field (duration of a frame interchange),
- the MAC data, which are absent if the frame is a control frame,
- and other fields such as FCS (Frame Check Sequence), tail, pad.

The STF field is invariant and is used for time synchronization. The LTF field is used for frequency synchronization, and the SIG field is used for signaling data intended for the receiver.

The fields and the data are modulated using OFDM (Orthogonal Frequency Division Multiplexing) modulation. A frame is represented as a succession of OFDM symbols.

In the seven-layer OSI (Open Systems Interconnection) communication model, which is used by local area networks based on the IEEE 802.11 standard, the PLCP sublayer is part of the physical layer, which is the first layer and the lowest. The MAC sublayer is part of the data link layer, which is the second layer of the model. On receiving a data or control frame, the PLCP sublayer of an entity first of all detects the frame beginning using the STF field. If the time synchronization is correct for a WiFi frame, the frame is demodulated, and the result is returned to the MAC sublayer.

The MAC sublayer checks the integrity of the frame using the FCS field, and, depending on the result, it moreover checks if the frame is indeed intended for the entity, using the MAC header. Similarly, the mechanism for generating a data frame or a control frame also requires interactions between the first two layers, the physical layer and the data link layer.

To make the interchange of a data frame more reliable, a control frame of RTS (Request To Send) type is first of all transmitted by the transmitting entity. Said control frame is intended to reserve the channel for a determined duration. The receiving entity responds by transmitting a control frame of CTS (Clear To Send) type. This control frame is intended to confirm the reservation of the channel, for a corrected duration. The transmitting entity then transmits the data frame, to which the receiving entity responds with a control frame of ACK (ACKnowldgement) type.

There is likewise a control frame of PSPOLL (Power Save Polling) type, which is transmitted by a receiving entity when it exits a standby period, so as to signal to a transmitting entity that it is ready to receive a data frame. If the transmitting entity actually has a data frame to transmit to it, it does so. Otherwise, it transmits a control frame of ACK type to it.

The SIFS (Short Inter-Frame Sequence) period allows, for the entities concerned by the transmission, the time to pass from transmission mode to reception mode (and vice versa). This period is included in the calculation of the value of the Duration field of the MAC header, if need be.

The data of a data frame are of variable size, ranging from approximately 100 bytes for voice over Internet protocol, or 127 bytes for data interchanged from machine to machine, to several kilobytes for video. On the basis of the IEEE 802.11a standard, the transmission of 100 bytes can take 40 µs, while transmission of a packet of 1500 bytes can take up to 2064 µs. All of the bytes making up the MAC part (header and data) are modulated at a speed optimized on the basis of the conditions of the transmission channel, for example at 36 Mbit/s for the 16QAM (16-state Quadrature Amplification Modulation) technique.

The SIG field (24 bytes) is modulated at a speed lower than that for the MAC part, for example at 6 Mbit/s for the BPSK (Binary Phase Shift Keying) technique, which makes the SIG field more robust than the fields of the MAC layer. The reason is that the modulated signals have a different range depending on the speed used; the higher the speed, the shorter the range of the signal and the higher the risk of error on reception.

On the basis of the IEEE 802.11a standard, the occupation of the transmission channel by a control frame (with its 20-byte MAC header) is in the order of 32 µs. For data traffic in which relatively short data frames can take approximately 40 µs of channel occupation, control frames are therefore a large share of the traffic, in relation to data frames, also known as "payload" frames. This is the case particularly with voice over IP traffic and data traffic between machines, where the bandwidth occupied by the control frames is a problem.

Moreover, the presence of an MAC header modulated at a higher speed in relation to the rest of the control frame reduces the robustness thereof, and constitutes a complexity factor for the modulation and demodulation operations of the control frame. For transmitting or receiving entities with substantial power constraints, such as those involved in interchanges between machines, this complexity factor gives rise to a power consumption that is likewise a problem.

There is therefore a need for a solution that does not exhibit these disadvantages.

3. SUMMARY OF THE INVENTION

The invention improves the situation by means of a method for the transmission of a control frame by a transmitting entity to a receiving entity, the control frame comprising a so-called first-layer header field, which is intended to transport information relating to a first layer, the method comprising a modulation step using a first modulation technique, and, prior to the modulation step, a step of insertion of information relating to a second layer into said first-layer header field.

By virtue of the invention, a second-layer header is no longer necessary in the control frame. This frees a first-layer header that is intended for processing the second-layer header. In relation to the prior art, this method therefore allows the length of the control frame to be shortened, and moreover allows the use of just a single modulation technique, rather than two (one per layer).

According to the prior art, for example using WiFi, the information relating to the MAC layer (second layer), that is to say the control frame type and the parameters thereof, is transported in the MAC header. According to the prior art, there is also an SIG field of the PLCP layer (first layer), said field being intended to transport information that is necessary for processing the MAC header. According to the invention, the information relating to the MAC layer, that is to say the control frame type and the parameters thereof, is inserted into the SIG field. This firstly frees the MAC header, which is no longer inserted into the control frame, and secondly frees the original use of the SIG field.

According to the prior art, the occupation of the transmission channel by a WiFi control frame (with its 20-byte MAC header) is in the order of 32 µs. For a WiFi control frame according to the invention (without an MAC header), this duration is in the order of 20 µs.

With the invention, since the control frame no longer comprises a field or header relating to the MAC layer, there is no need for any modulation using a modulation technique relating to this MAC layer. All that remains is the modulation of the SIG field using a modulation technique relating to the PLCP layer, which is more robust and less complex than the modulation technique relating to the MAC layer.

It will be understood that, by virtue of the invention, a control frame is shorter and that the transmitting entity needs to implement only a single mode of modulation, the latter relating to the first layer, which happens to be the most robust. This allows a reduction in the bandwidth taken by the control frames in the data traffic, an increase in the transmission robustness thereof and a reduction in the number and complexity of the modulation operations in the transmitting entity.

According to one aspect of the invention, the inserted information relating to the second layer comprises at least one piece of information from a group comprising at least:
  one piece of information relating to the control frame type (PLCP type),
  one piece of information relating to the duration (DUR) of the interchange between the transmitting and receiving entities,
  one identifier for the transmitting entity (Partial TA),
  one identifier for the receiving entity (Partial RA).

Advantageously, with the information inserted into the header field relating to the first layer, it is possible to obtain the various control frame types that are necessary for the interchange of data frames between two entities.

The table below lists by way of example the composition of the SIG field for the main control frames used for WiFi:

| Control frame type | Present in SIG | | |
| --- | --- | --- | --- |
| | Duration of the interchange | Transmitting entity identifier | Receiving entity identifier |
| RTS | Yes | Yes | Yes |
| CTS | Yes | No | Yes |
| ACK | No | No | Yes |
| PSPOLL | No | Yes | Yes |

By way of example, an ACK control frame (so-called "acknowledgement" frame for WiFi) comprises, in its SIG field, not only the "ACK" type but also an identifier for the receiving entity for which the ACK frame is intended, but does not comprise an identifier for the transmitting entity, nor any duration information.

The invention also concerns a method for the reception of a control frame by a receiving entity from a transmitting entity, the control frame comprising a header field that is intended to transport information relating to a first layer, the method comprising a demodulation step for said header field using a first modulation technique, and, following the demodulation step, an extraction step for extracting information relating to a second layer, from the demodulated header field.

The information extracted in this way can be transmitted to the second layer, for example the MAC layer, so as to be processed therein as information relating to this layer.

In relation to the prior art, this method allows the use of just a single demodulation type when a control frame is received, rather than two. This allows a reduction in the number and complexity of the demodulation operations in the receiving entity.

According to one aspect of the invention, the extracted information is not transmitted to the second layer if no correspondence is detected between the identifier of the receiving entity and the extracted information.

Advantageously, the processing of a control frame that is received by the receiving entity but that is not intended therefor stops at the first layer, for example the PLCP layer, without involving the second layer, for example the MAC layer. This gives rise to a saving in time and calculations for the receiving entity.

The invention also concerns a method for the transmission of a data frame by a transmitting entity to a receiving entity, comprising, prior to a step of transmission of the data frame, the following steps:
  transmission of a reservation request control frame, which is intended to reserve a communication channel between the transmitting entity and the receiving entity, the reservation request control frame being transmitted in accordance with the method for the transmission of a control frame that has just been described,
  reception of a reservation confirmation control frame, which is intended to confirm to the transmitting entity the reservation of the communication channel by the receiving entity, the reservation confirmation control frame being received in accordance with the method for the reception of a control frame that has just been described.

For each transmitted data frame, at least two control frames are interchanged between the transmitting and receiving entities. The share of the control frames in relation to that of the data frames is large, particularly when the data frames are short. It will therefore be understood that, by virtue of the invention, the share taken by the volume of the control frames in the traffic generated by the transmission of data frames is decreased because the size of the control frames is decreased in relation to the prior art.

The invention also concerns a method for the reception of a data frame by a receiving entity from a transmitting entity, comprising, following a step of reception of the data frame, a step of transmission of an acknowledgement control frame, which is intended to acknowledge to the transmitting entity the reception of the data frame, the acknowledgement control frame being transmitted in accordance with the method for the transmission of a control frame that has just been described.

For each received data frame, at least one control frame is transmitted. The share of the control frames in relation to that of the data frames is large, particularly when the data frames are short. It will therefore be understood that, by virtue of the invention, the share taken by the volume of the control frames in the traffic generated by the reception of data frames is decreased because the size of the control frames is decreased in relation to the prior art.

According to one aspect of the invention, the step of reception of a data frame is preceded by a step of transmission of a standby exit indication control frame, which is intended to inform the transmitting entity that the receiving entity has exited a standby mode and is ready to receive a data frame, the standby exit indication control frame being transmitted in accordance with the method for the transmission of a control frame that has just been described.

For WiFi, for example, this aspect allows a control frame of "PSPOLL" type to be taken into account.

The invention also concerns a device for the transmission of a control frame by a transmitting entity to a receiving entity, the control frame comprising a header field that is intended to transport information relating to a first layer, said header field being modulated using a first modulation technique, the device comprising a unit for the insertion of information relating to a second layer, into the header field relating to the first layer.

The invention also concerns a device for the reception of a control frame by a receiving entity from a transmitting entity, the control frame comprising a header field that is intended to transport information relating to a first layer, said header field being demodulated using a first modulation technique, the device comprising a unit for the extraction of information relating to a second layer, from the header field relating to the first layer.

The invention also concerns a device for the transmission of a data frame by a transmitting entity to a receiving entity, comprising:
 a device for the transmission of a control frame as described above, which is capable of generating a reservation request control frame intended to reserve for the data frame a communication channel between the transmitting entity and the receiving entity,
 a device for the reception of a control frame as described above, which is capable of processing a reservation confirmation control frame intended to confirm to the transmitting entity the reservation of the communication channel by the receiving entity.

The invention also concerns a device for the reception of a data frame by a receiving entity from a transmitting entity, comprising:
 a device for the transmission of a control frame as described above, which is capable of generating an acknowledgement control frame intended to acknowledge to the transmitting entity the reception of the data frame by the receiving entity.

The invention also concerns a control signal carrying a control frame that is transmitted by a transmitting entity and that is intended for a receiving entity, the control frame comprising a field relating to a first layer modulated using a modulation technique relating to the first layer, the field comprising information relating to a second layer.

In relation to the prior art, this signal according to the invention occupies less bandwidth because the information relating to the second layer is inserted not into a field relating to the second layer, but rather into a pre-existing field relating to the first layer, reuse of which to this end is permitted owing to the absence of a field relating to the second layer.

According to one aspect of the invention, the information relating to the second layer that is comprised in the signal comprises at least one piece of information from a group comprising at least:
 one piece of information relating to the control frame type,
 one piece of information relating to the duration of the interchange between the transmitting and receiving entities,
 one identifier for the transmitting entity,
 one identifier for the receiving entity.

Thus, the signal may carry any one of the control frames that are necessary for the transport of a data frame between a transmitting entity and a receiving entity, including, inter alia, the channel reservation, channel reservation confirmation, acknowledgement or standby exit indication frames.

The invention also concerns a transmitting entity connected to a communication network, comprising at least one device for the transmission of a data frame as described above.

Such a transmitting entity is the access point or a station in a WiFi network, for example. The access point is a home or professional Internet access gateway, for example, and the station is a computer, a tablet, a telephone or a television signal decoder, for example.

The invention also concerns a receiving entity connected to a communication network, comprising at least one device for the reception of a data frame as described above.

Such a receiving entity is the access point or a station in a WiFi network, for example. The access point is a home or professional Internet access gateway, for example, and the station is a computer, a tablet, a telephone or a television signal decoder, for example.

The invention likewise concerns a transmitting and receiving entity, comprising both a device for the transmission of a data frame as described above and a device for the reception of a data frame as described above.

The invention also concerns a communication system, characterized in that it comprises at least one transmitting entity as described above and at least one receiving entity as described above.

Such a system comprises the access point and the station(s) in a WiFi network, for example.

The invention also concerns a computer program, comprising instructions for the implementation of the steps of the method for the transmission of a control frame as described above when this method is executed by a processor.

The invention likewise concerns a recording medium for the program that has just been described, which is computer-readable, being able to use any programming language, and to be in the form of source code, object code or intermediate code between source code and object code, as in a partially compiled form, or in any other desirable form.

The invention also concerns a computer program, comprising instructions for the implementation of the steps of the method for the reception of a control frame as described above when this method is executed by a processor.

The invention likewise concerns a recording medium for the program that has just been described, which is computer-readable, being able to use any programming language, and to be in the form of source code, object code or intermediate code between source code and object code, as in a partially compiled form, or in any other desirable form.

The invention also concerns a computer program, comprising instructions for the implementation of the steps of the method for the transmission of a data frame as described above when this method is executed by a processor.

The invention likewise concerns a recording medium for the program that has just been described, which is computer-readable, being able to use any programming language, and to be in the form of source code, object code or intermediate code between source code and object code, as in a partially compiled form, or in any other desirable form.

The invention also concerns a computer program, comprising instructions for the implementation of the steps of the method for the reception of a data frame as described above when this method is executed by a processor.

Finally, the invention concerns a recording medium for the program that has just been described, which is computer-readable, being able to use any programming language, and to be in the form of source code, object code or intermediate code between source code and object code, as in a partially compiled form, or in any other desirable form.

4. PRESENTATION OF THE FIGURES

Figure 2:
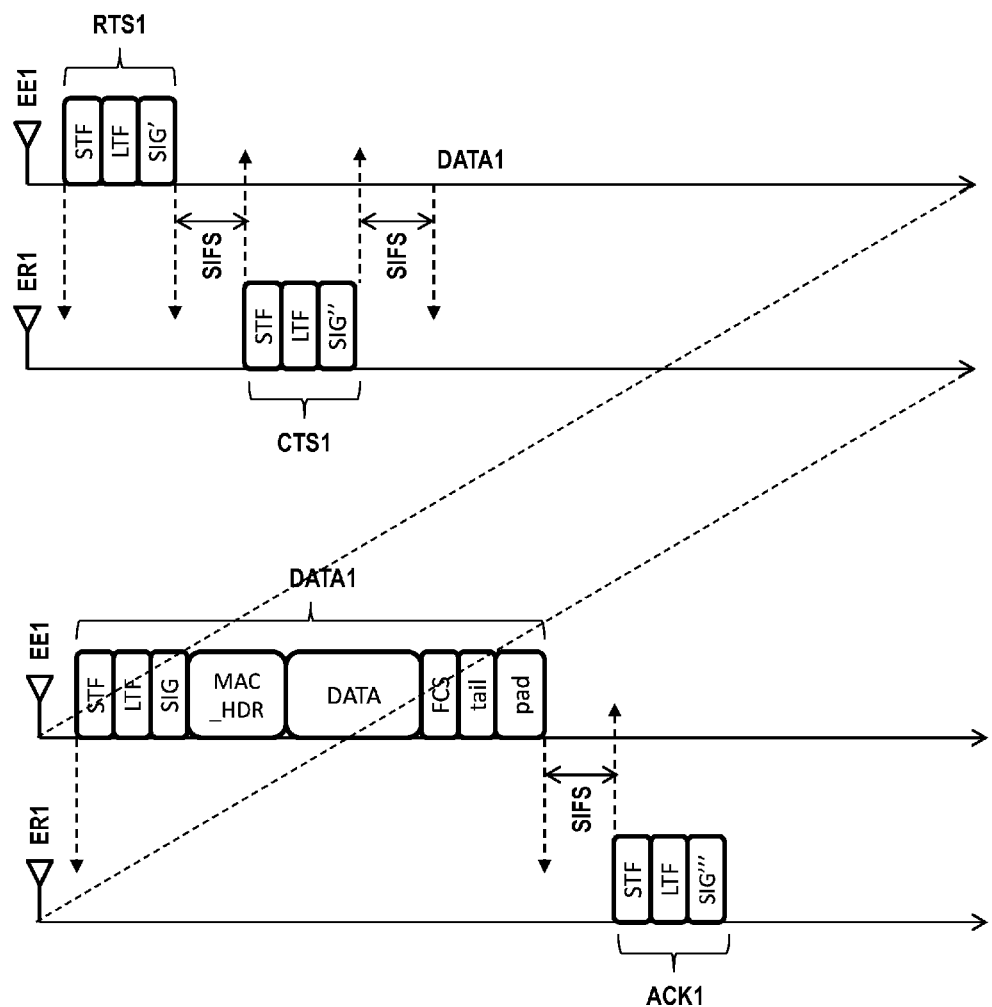
Figure 3A:
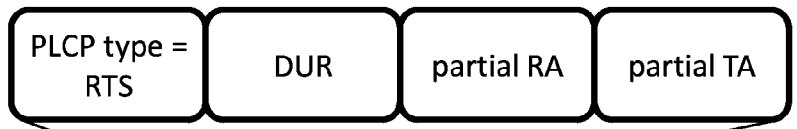
Figure 3B:
Figure 3C:
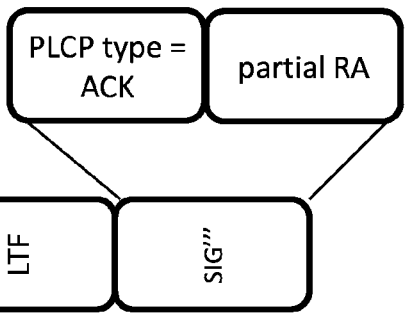
Figure 3D:
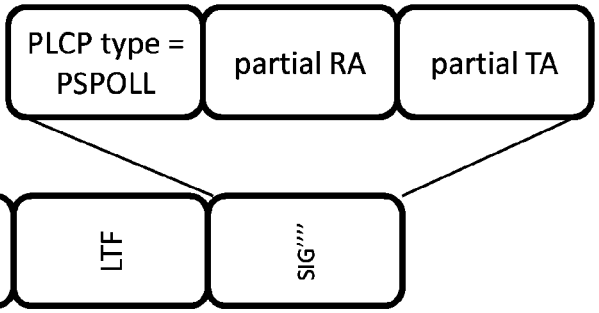
Figure 4:
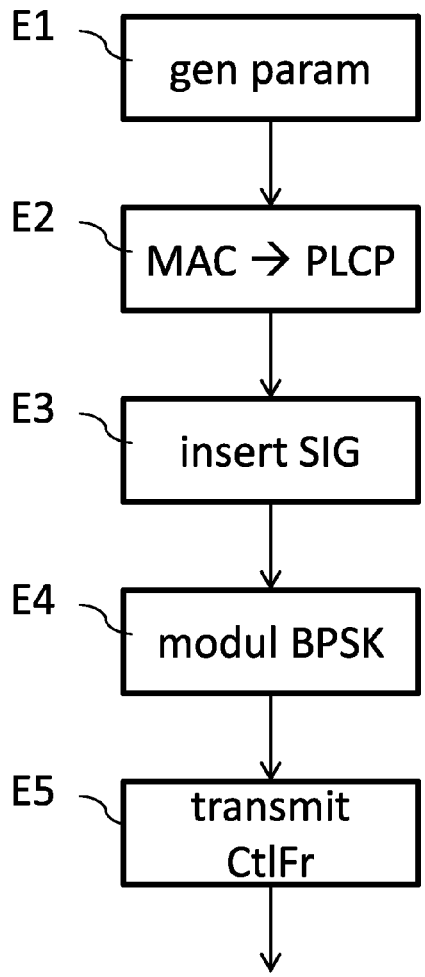
Figure 5:
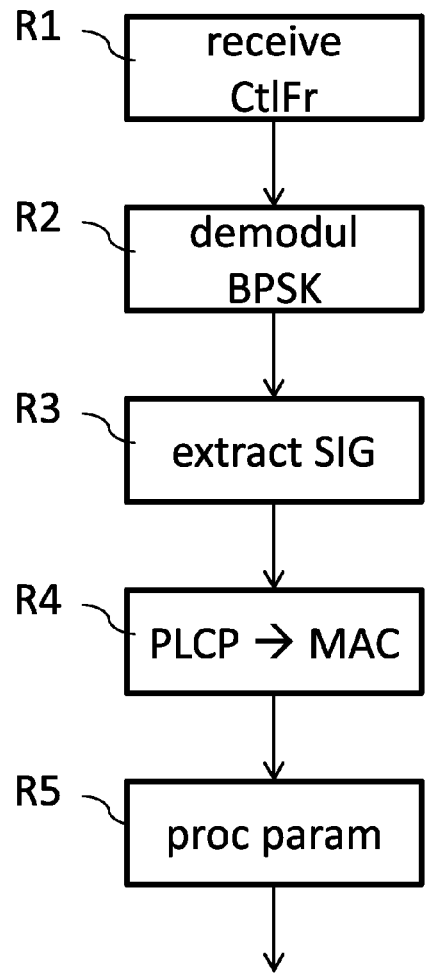
Figure 6:
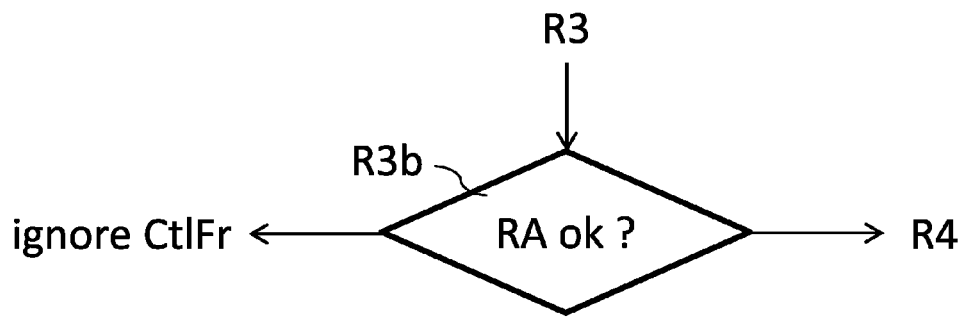
Figure 7:
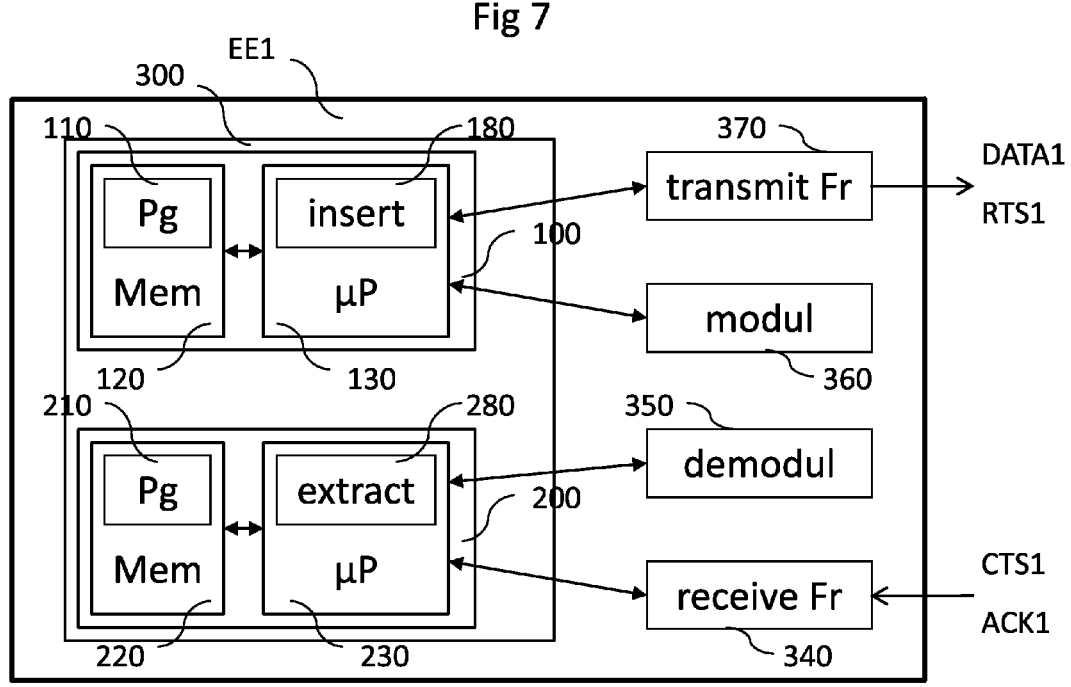
Figure 8:
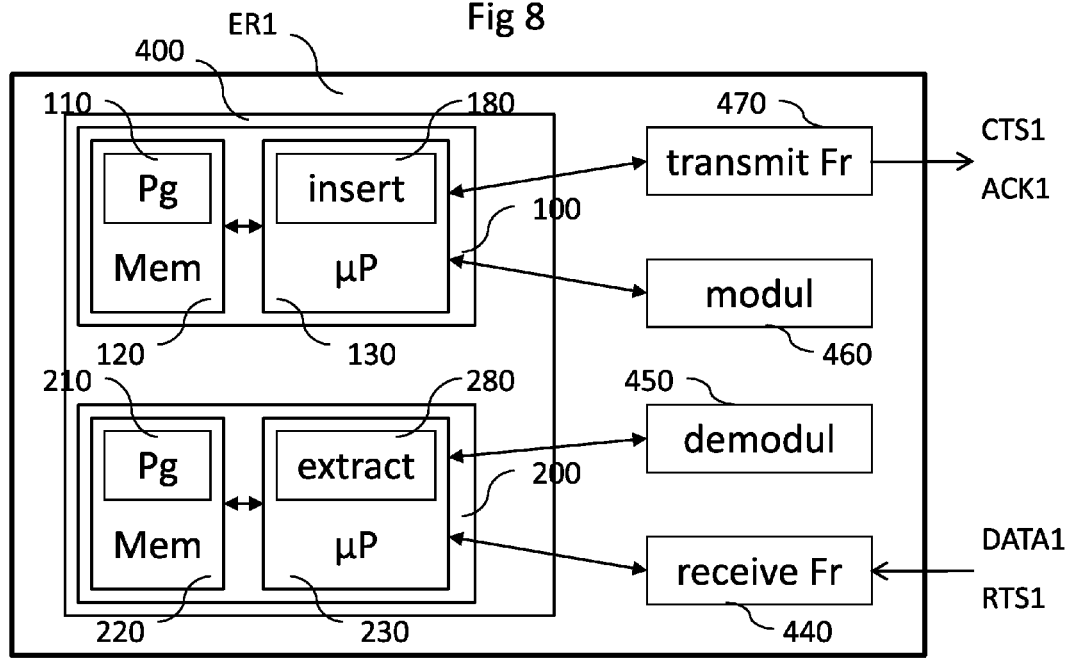

Other advantages and features of the invention will become more clear upon reading the description below of a particular embodiment of the invention, which is provided by way of simple illustrative and nonlimiting example, and the appended drawings, in which:

FIG. 1 shows the structure of a data frame and the structure of various control frames according to the prior art, FIG. 2 shows the structure of a data frame and the structure of various control frames according to an embodiment of the invention, FIGS. 3A to 3D show the structure of various control frames according to an embodiment of the invention in detail, FIG. 4 shows the steps of the method for the transmission of a control frame according to an embodiment of the invention, FIG. 5 shows the steps of the method for the reception of a control frame according to an embodiment of the invention, FIG. 6 shows the steps of the method for the reception of a control frame according to another embodiment of the invention, FIG. 7 shows a design example for a transmitting entity EE1, according to the invention, FIG. 8 shows a design example for a receiving entity ER1, according to the invention.

5. DETAILED DESCRIPTION OF AT LEAST ONE EMBODIMENT OF THE INVENTION

In the remainder of the description, consideration will be given to the case of embodiments of the invention by means of entities communicating among one another by WiFi, that is to say by means of a transmission channel based on the IEEE 802.11 standard. The invention is not limited to this case, and can be applied to other types of transmission channels such as powerline communication (IEEE 1901 standard), or wireless optical communication (IEEE 802.15.7 standard).

The structure of a data frame DATA1 and the structure of the control frames RTS0, CTS0 and ACK0, according to the prior art, have been presented further above with reference to FIG. 1.

FIG. 2 shows the structure of a data frame and the structure of various control frames, according to an embodiment of the invention.

The sequence, illustrated as an example, between control frames and data frame remains unchanged in relation to the prior art and has been described with reference to FIG. 1.

The control frames RTS1, CTS1 and ACK1, or channel reservation request, channel reservation confirmation and acknowledgement frames, contrary to the prior art, comprise neither a MAC header nor the following fields, FCS, tail and pad. The control frames according to the invention comprise the STF and LTF fields, which remain unchanged in relation to the prior art, and a modified SIG field. As illustrated in FIGS. 3A to 3D, the invention proposes unanticipated use of the SIG field by inserting into it information relating to the second layer (MAC), which is usually inserted into the MAC header.

Prior to the transmission of a control frame, the modified SIG field is modulated using a low-speed modulation technique that is specific to the first layer, for example BPSK.

Thus, while keeping the functionality of the control frames, not only are they shorter but it is no longer necessary to apply high-speed modulation to them that is specific to the MAC header, for example 16QAM.

FIGS. 3A to 3D show the structure of various control frames according to one embodiment of the invention in detail.

It will be recalled that the STF and LTF fields remain unchanged in relation to the prior art.

The modified SIG field can comprise up to four fields:
PCLP type: indicates the control frame type; this field is always present,
DUR: indicates an interchange duration for (a) frame(s); this duration can be expressed in microseconds, or as a number of OFDM symbols, each OFDM symbol having a duration of 4 microseconds,
Partial RA: simplified identifier for the receiving entity, being able to be a simplified destination MAC address such as the Partial AID based on the 802.11 standard,
Partial TA: simplified identifier for the transmitting entity, being able to be a simplified source MAC address such as the Partial AID based on the 802.11 standard.

FIG. 3A illustrates the composition of a control frame of RTS type, that is to say a frame transmitted by an entity wishing to transmit a data frame to a receiving entity, which is intended to request the reservation of a communication channel for a certain duration between the two entities. The SIG' field of a control frame of RTS type comprises, besides a PLCP type field (with the value RTS), a DUR field, a Partial RA field and a Partial TA field.

FIG. 3B illustrates the composition of a control frame of CTS type, that is to say a frame transmitted by an entity that has previously received a control frame of RTS type, which is intended to confirm the reservation of a communication channel for a certain duration, the duration being corrected by this entity in order to take account of the duration that has elapsed since the reception of the control frame RTS. The SIG" field of a control frame of CTS type comprises, besides a PLCP type field (with the value CTS), a DUR field, and a Partial RA field.

FIG. 3C illustrates the composition of a control frame of ACK type, that is to say a frame transmitted by an entity that has previously received a data frame, which is intended to confirm to the entity transmitting the data frame the correct reception of the data frame. The SIG''' field of a control frame of ACK type comprises, besides a PLCP type field (with the value ACK), a Partial RA field.

FIG. 3D illustrates the composition of a control frame of PSPOLL type, that is to say a frame transmitted by an entity exiting a standby mode and wishing to indicate, to another entity that is capable of transmitting a data frame, that it is in a mode that allows it to receive a data frame. The SIG'''' field of a control frame of PSPOLL type comprises, besides a PLCP type field (with the value PSPOLL), a Partial RA field and a Partial TA field.

FIG. 4 shows the steps of the method for the transmission of a control frame according to an embodiment of the invention.

The method is presented on the basis of the example of the frame RTS1 with reference to FIG. 2.

In a step E1, the entity EE1 generates, on its MAC layer, the parameters characterizing the frame RTS1, that is to say:
 The type of the control frame that is the subject of the method: RTS,
 The duration of the complete interchange between the entities EE1 and ER2, taking account of the speed of the transmission channel, the length of the frames RTS1, CTS1, the data frame, and the SIFS periods and the modulations used; this duration can be expressed in microseconds or as a number of OFDM symbols,
 The simplified identifier of the receiving entity (ER1): Partial RA,
 The simplified identity of the transmitting entity (EE1): Partial TA.

In a step E2, these parameters, which are generated by the MAC layer, are transferred to the PLCP layer of the entity EE1.

In a step E3, the PLCP layer of the entity EE1 inserts the parameters from the MAC layer into the SIG' field of a control frame having, besides the SIG' field, an STF field and an LTF field.

In the step E4, the PLCP layer of the entity EE1 applies modulation of BPSK type to the SIG' field. The frame RTS1 is now ready to be transmitted.

In the step E5, the PLCP layer of the entity EE1 transmits the frame RTS1.

FIG. 5 shows the steps of the method for the reception of a control frame according to an embodiment of the invention.

The method is presented on the basis of the example of the frame RTS1 with reference to FIG. 2.

In a step R1, the PLCP layer of the entity ER1 receives the frame RTS1 and detects that it is composed of an STF field, an LTF field and an SIG' field.

In a step R2, the PLCP layer of the entity ER1 demodulates the SIG' field of the frame RTS1.

In a step R3, the PLCP layer of the entity ER1 extracts the following MAC layer parameters from the SIG' field:
 The type of the control frame that is the subject of the method: RTS,
 The duration of the complete interchange reserved by the entity EE1,
 The simplified identifier of the receiving entity (ER1): Partial RA,
 The simplified identifier of the transmitting entity (EE1): Partial TA.

In a step R4, these parameters are transferred from the PLCP layer to the MAC layer of the entity EE1.

In a step R5, the parameters are processed on the MAC layer. The processing includes the decision to respond by a frame CTS1. This decision is followed by steps similar to steps E1 to E5 described above, leading to the transmission of the frame CTS1 by ER1 to EE1.

FIG. 6 shows steps of the method for the reception of a control frame according to another embodiment of the invention.

In this advantageous variant, in a step R3b following step R3, the PLCP layer checks that the simplified identifier of the receiving entity, Partial RA, extracted from the SIG' field, actually corresponds to that of the entity ER1.

If correspondence exists, the following step continues to be step R4.

If no correspondence exists, the received control frame is ignored because it is not intended for the entity ER1, and steps R4 and R5 are not executed. This allows the fastest determination of the fact that the frame is not intended for ER1, without having to transmit the extracted parameters to the MAC layer so that the latter is able to arrive at the same conclusion. Thus, a saving in time and calculations is achieved.

The invention is implemented by means of software and/or hardware components. With this in mind, the terms "module" and "unit" may, in this document, correspond both to a software component and to a hardware component or to a set of hardware and/or software components that is capable of implementing a function or a set of functions, according to what is described for the module in question.

With reference to FIG. 7, a design example for a transmitting entity EE1 according to the invention will now be presented.

In this example, the transmitting entity EE1 comprises at least:
 a device 300 for the transmission of a data frame,
 a transmission module 370, which is capable of transmitting a control frame (RTS1) or a data frame (DATA1),
 a modulator 360, which is capable of modulating the fields of a frame before transmission thereof,
 a demodulator 350, which is capable of demodulating fields of a frame after reception thereof,
 a reception module 340, which is capable of receiving a control frame (CTS1, ACK1).

The device 300 for the transmission of a data frame comprises at least:
 a device 100 for the transmission of a control frame, which is capable of implementing the steps of the method for the transmission of a control frame as described above,
 a device 200 for the reception of a control frame, which is capable of implementing the steps of the method for the reception of a control frame as described above.

The device 100 for the transmission of a control frame comprises a processing unit 130 that is equipped with a microprocessor for implementing the means constituting the invention as are described above. In particular, the device 100 comprises a unit 180 for inserting information relating to a second layer into a header field relating to a first layer. The insertion unit 180 is controlled by the microprocessor of the processing unit 130.

Moreover, the device 100 comprises a memory 120 that stores a computer program 110 implementing the steps of the method for the transmission of a control frame. Upon initialization, the code instructions of the computer program 110 are loaded into a RAM store, for example, before being executed by the processor of the processing unit 130.

The device 100 for the transmission of a control frame is capable of cooperating at least with the transmission module 370 and the modulator 360.

By way of example, under the control of the processing unit 130, the insertion unit 180 inserts the parameters PLCP type, DUR, Partial RA and Partial TA into a SIG field of a control frame RTS. The processing unit 130 then instructs the modulator 360 to modulate the SIG field, and then the transmission module 370 to transmit the frame RTS.

The device 200 for the reception of a control frame comprises a processing unit 230 equipped with a microprocessor for implementing the means constituting the invention as are described above. In particular, the device 200 comprises a unit 180 for the extraction of information relating to a second layer from a header field relating to a first layer. The extraction unit 280 is controlled by the microprocessor of the processing unit 230.

Moreover, the device 200 comprises a memory 220 that stores a computer program 210 implementing the steps of the method for the reception of a control frame. Upon initialization, the code instructions of the computer program 210 are loaded into a RAM store, for example, before being executed by the processor of the processing unit 230.

The device 200 for the reception of a control frame is capable of cooperating at least with the reception module 340 and the demodulator 350.

By way of example, when a frame CTS is received by the reception module 340, the processing unit 230 instructs the module 340 to send the demodulator 350 the SIG field of the frame so that the latter is demodulated. Then, under the control of the processing unit 230, the extraction unit 280 extracts the parameters PLCP type, DUR, and Partial RA from the demodulated SIG field.

With reference to FIG. 8, a design example for a receiving entity ER1 according to the invention will now be presented.

In this example, the receiving entity ER1 comprises at least:
- a device 400 for the reception of a data frame,
- a reception module 440, which is capable of receiving a data frame (DATA1) or a control frame (RTS1),
- a demodulator 450, which is capable of demodulating the fields of a frame after reception thereof,
- a modulator 460, which is capable of modulating fields of a frame before transmission thereof,
- a transmission module 470, which is capable of transmitting a control frame (CTS1, ACK1).

The device 400 for the transmission of a data frame comprises at least:
- a device 100 for the transmission of a control frame, which has already been described with reference to FIG. 7,
- a device 200 for the reception of a control frame, which has already been described with reference to FIG. 7.

According to a preferred embodiment of the invention, an entity can be both a transmitting entity (EE1) and a receiving entity (ER1). In this case, it is possible to use just a single transmission module 370 or 470, a single modulator 360 or 460, a single demodulator 350 or 450, and/or a single reception module 340 or 440.

The exemplary embodiments of the invention that have just been presented are just some of the embodiments that are conceivable. They show that the invention allows a reduction in the bandwidth taken by control frames in data traffic, an increase in the transmission robustness thereof and a reduction in the number and complexity of the modulation operations in the transmitting entity, and also in the number and complexity of the demodulation operations in the receiving entity.

The invention claimed is:

1. A method comprising:
transmitting a control frame by a transmitting entity to a receiving entity, the control frame comprising a physical layer header field, which is configured to transport information relating to the physical layer, wherein transmitting comprises the following acts implemented by the transmitting entity:
inserting information relating to a MAC layer header into said physical layer header field, said MAC layer header not being inserted into the control frame; and
modulating the control frame in a single modulation act, using a modulation technique relating to the physical layer.

2. The method as claimed in claim 1, wherein the inserted information relating to the MAC layer header comprises at least one piece of information from a group consisting of:
one piece of information relating to the control frame type,
one piece of information relating to the duration of the interchange between the transmitting and receiving entities,
one identifier for the transmitting entity,
one identifier for the receiving entity.

3. A method comprising:
receiving a control frame by a receiving entity from a transmitting entity, the control frame comprising a header field that is configured to transport information relating to a physical layer, wherein receiving comprises the following acts implemented by the receiving entity:
demodulating the control frame in a single demodulation act, using a modulation technique relating to the physical layer, and
an extraction act, extracting information relating to a MAC layer, from the demodulated header field, the extracted information not being transmitted to the MAC layer if no correspondence is detected between an identifier of the receiving entity and the extracted information.

4. A device for transmission of a control frame by a transmitting entity to a receiving entity, the control frame comprising a header field that is configured to transport information relating to a physical layer, wherein the device comprises:
a unit configured to insert information relating to a MAC layer header, into the header field relating to the physical layer, said MAC layer header not being inserted into the control frame, and
a modulator configured to modulate said header field using a modulation technique relating to the physical layer.

5. A device for reception of a control frame by a receiving entity from a transmitting entity, the control frame comprising a header field that is configured to transport information relating to a physical layer, wherein the device comprises:
- a demodulator configured to demodulate said header field using a modulation technique relating to the physical layer, and
- a unit configured to extract information relating to a MAC layer, from the header field relating to the physical layer, the extracted information not being transmitted to the MAC layer if no correspondence is detected between an identifier of the receiving entity and the extracted information.

6. The method as claimed in claim 1, wherein the control frame is used for WiFi and the inserted information relating to the MAC layer header comprises at least one identifier for the receiving entity.

7. The method as claimed in claim 1, wherein the control frame is used for WiFi and the inserted information relating to the MAC layer header comprises at least one identifier for the receiving entity and one piece of information relating to a type of the control frame, and wherein the type of the control frame is one of a group consisting of:
- RTS,
- CTS,
- ACK,
- PSPOLL.

* * * * *